US011798006B1

(12) United States Patent
Langley et al.

(10) Patent No.: US 11,798,006 B1
(45) Date of Patent: Oct. 24, 2023

(54) AUTOMATING CONTENT AND INFORMATION DELIVERY

(71) Applicant: United Services Automobile Association, San Antonio, TX (US)

(72) Inventors: Guy R. Langley, San Antonio, TX (US); Jason W. Lindley, Schertz, TX (US); Donald H. Griffin, Jr., Peoria, AZ (US); Elizabeth Garretson, Fair Oaks Ranch, TX (US); Ryan R. Barth, San Antonio, TX (US); Francisco A. Duran, San Antonio, TX (US); Ann C. Tarrillion, San Antonio, TX (US); David W. Roberts, Helotes, TX (US)

(73) Assignee: United Services Automobile Association, San Antonio, TX (US)

( * ) Notice: Subject to any disclaimer, the term of this patent is extended or adjusted under 35 U.S.C. 154(b) by 0 days.

(21) Appl. No.: 17/725,321

(22) Filed: Apr. 20, 2022

Related U.S. Application Data

(63) Continuation of application No. 14/705,130, filed on May 6, 2015, now Pat. No. 11,341,505.
(Continued)

(51) Int. Cl.
*G06Q 30/016* (2023.01)
*G06Q 40/08* (2012.01)

(52) U.S. Cl.
CPC ........... *G06Q 30/016* (2013.01); *G06Q 40/08* (2013.01)

(58) Field of Classification Search
CPC ............................ G06Q 30/016; G06Q 40/08
See application file for complete search history.

(56) References Cited

U.S. PATENT DOCUMENTS 5,450,477 A    9/1995  Amarant et al.
6,473,745 B2  10/2002  Doerr et al.
(Continued)

FOREIGN PATENT DOCUMENTS

| WO | WO-0246872 A2 * | 6/2002 | ............. H04M 3/51 |
| WO | WO-200246872 | 6/2002 | |
| WO | WO-2013075151 A1 * | 5/2013 | ............. G06Q 40/08 |

OTHER PUBLICATIONS

Open Speech Recognizer—A Intelligent, Scalable, and Comprehensive Speech Recognition Solution from Speech Works (Year: 2005).*
(Continued)

*Primary Examiner* — Scott C Anderson
*Assistant Examiner* — James H Miller
(74) *Attorney, Agent, or Firm* — Locke Lord LLP; Christopher J. Capelli

(57) ABSTRACT

A computer-implemented method and system for automating electronic content delivery of predictive information to a customer service representative of a company. A first customer data set is entered in the computer system for identifying a customer. Displayed on a first desktop on a representative's computer system is information related to the customer which may include purchased company products and services of the customer based on the first data set. A second data set is entered in the computer system by the representative contingent upon interaction between the representative and the customer. Perform predictive analytics upon at least a portion of the first and second data sets to determine predictive information relevant to the customer. Display on a second desktop on the representative's computer system the predictive information for review by the representative during an interaction with the customer.

20 Claims, 6 Drawing Sheets

Related U.S. Application Data

(60) Provisional application No. 61/988,378, filed on May 5, 2014.

(56) References Cited

U.S. PATENT DOCUMENTS

| | | | | |
|---|---|---|---|---|
| 8,326,643 | B1* | 12/2012 | Eshkenazi | G06Q 30/02 |
| | | | | 379/265.06 |
| 8,706,531 | B1* | 4/2014 | Voigt | G06Q 40/08 |
| | | | | 705/37 |
| 9,036,810 | B1 | 5/2015 | Martinez et al. | |
| 10,379,712 | B2 | 8/2019 | Brown et al. | |
| 11,341,505 | B1* | 5/2022 | Langley | G06Q 40/08 |
| 2005/0267784 | A1* | 12/2005 | Slen | G06Q 10/10 |
| | | | | 705/4 |
| 2006/0031077 | A1* | 2/2006 | Dalton | G06Q 30/02 |
| | | | | 702/27 |
| 2007/0174390 | A1 | 7/2007 | Silvain et al. | |
| 2009/0248560 | A1* | 10/2009 | Recce | G06Q 99/00 |
| | | | | 705/500 |
| 2010/0100561 | A1* | 4/2010 | Cooper | G06Q 10/10 |
| | | | | 707/769 |
| 2010/0262464 | A1* | 10/2010 | Monteforte | G06Q 30/0268 |
| | | | | 705/14.65 |
| 2010/0332264 | A1* | 12/2010 | Golembiewski | G06Q 40/08 |
| | | | | 705/4 |
| 2013/0156165 | A1 | 6/2013 | Springer | |
| 2013/0283168 | A1* | 10/2013 | Brown | G06F 3/165 |
| | | | | 715/728 |
| 2014/0067375 | A1 | 3/2014 | Wooters | |

OTHER PUBLICATIONS

Remote monitoring that's close to perfect (Year: 2006).*
Nuance—Open Speech Recognizer (Year: 2006).*
Open Speech Recognizer—An Intelligent, Scalable, and Comprehensive Speech Recognition Solution from Speech Works (Year: 2005).*
Genesys Voice Platform (Year: 2006).*
Call Analyzer (Year: 2006).*
Method of note categorization validation, through automatic and real time notes via semantic natural language processing. IP.com No. IPCOM000225828D (Year: 2013).*
NPL: Method of note categorization validation, through automatic and real time notes via semantic natural language processing, IP.Com No. IPCOM000225828D (Mar. 7, 2013) (Year: 2013).

* cited by examiner

← → http://design.usaa.com/enterprise/mcr_lob/futureDesktop_phaseIII/ ⌕ ▾ C X | e Desktop of the Future - Left... ×

MISTER TOM THOMPSON #008472202
Title/Contact With: MISTER THOMPSON
High Risk Authenticated
Tenure: 23 YRS | DOB (Age): 04/23/1970 (45) | Eligibility: EX-DEPENDENT CLICK TO CALL
Member is browsing: Renters Quote – Personal Belongings ←——1024
☐ Online (usaa.com)

[Close Member]

NOTICES
DO NOT MENTION EX-WIFE, MARY JO THOMPSON

HOUSEHOLD
MELISSA SPOUSE (36) =00392748
SALLY CHILD (9) =00392748
DYLAN CHILD (2) =00392748
[Add/Manage CAPS]  [Create/Edit]

PERSONAL PROFILE ←——1026
Mobile Phone: (312) 555-1234  [Dial]
Primary E-mail: tthomp123@gmail.com  [Send]
Mailing Address: 1250 JUPITER DRIVE CHICAGO, IL 54321-1250
Special Handling: NONE
usaa.com Registered? ✓ iD: tthompson283  [Reset] [Unlock]
Password: 🔒  [Reset] [Lock]
PIN: ✓
Notification Preferences: Mobile App
Security Preferences: ✓ Standard
Elec Docs/UDO: ✓ Agreement Signed-All UDO

RECENT ACTIVITY
ⓘ Member is online (usaa.com)
□ Withdrawal of $9000 from Emergency Fund – 2 weeks ago
□ Fixed Rate Loan $40,000 – 2 weeks ago

MEMBER PRODUCTS [Household View]          ←——1023

🏦 Banking
Four Star Checking (Joint)          ***4567      $3,768.03
Savings Account (Joint)             ***0989     $12,346.21
Four Star Checking (Individual)     ***0909        $590.12
Savings Account (Individual)        ***0772        $500.00
Fixed Rate Auto Loan                ***090      $39,038.55

🛡 P&C Insurance                                    [Add]
Auto Insurance                      07101         $386.00
Extended Vehicle Protection         90020544

❤ Life Insurance                                   [Add]

📈 Investments                                      [Add]
529 College Savings                 ***5678     $11,700.00
Mutual Fund (Joint)                 ***0989     $12,000.00

Non-USAA Accounts                                  [Add]
Bank of America (Credit Card)       ***2586      $3,454.26
                                    ←——1027

LIFE PLAN                                  Life Events
Emergency Fund
[5%] ▬▬▬▬▬                          $10,000
Saved: $500.00   Remaining: $9,500.00

College Savings Fund
[9%] ▬▬▬▬▬                         $130,000
Saved: $11,700.00   Remaining: $118,500.00      🚗 Auto  [Create New]

Travel Fund
[33%] ▬▬▬▬▬▬▬                       $3,000                    [Edit]
Saved: $1000.00   Remaining: $2,000.00         HOMEBASE
                                                    1021
                                      ⚠ Offers accepted is low.
                    ←——1025

SCRATCH PAD NOTES
Moving from
                    1022

[3 Open Members]

Knowledge Delivery – The right answers at the right time

What if you no longer had to remember procedures or how to search for them? With Knowledge Delivery you can have immediate access to information related to applications without searching. If you absolutely need to search for information use simply natural language to quickly get what you need.

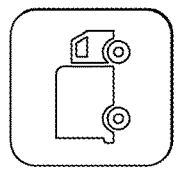

1032

Save for Knowledge Search

Get Field level information with one click

1034

When a policy or procedure changes get an in context alert

1030

1032

Location of Your Personal Belongings

Where are your belongings located?  ○ Domestic  ○ International

Address Line 1

Address Line 2  (OPTIONAL)

City

State  [- Select -]

County Name

ZIP  [- Select -]

Country  United States

Is this address within the city limits?  ○ Yes  ○ No

Is this address a military academy?  ○ Yes  ○ No

Is this address an ROTC dorm?  ○ Yes  ○ No

Is this address on a military installation?  ○ Yes  ○ No

AUTOMATING CONTENT AND INFORMATION DELIVERY

CROSS REFERENCE TO RELATED APPLICATIONS

This application is a Continuation of U.S. patent application Ser. No. 14/705,130 filed May 6, 2015, which claims priority to U.S. Patent Application No. 61/988,378 filed May 5, 2014, which are incorporated herein by reference in its entirety.

FIELD OF THE INVENTION

The disclosed embodiments generally relate to a method and computerized system for generating and automating information delivery, and more particularly, to utilizing informatics to effectuate predictive information delivery automatically as well as in response to requests for the same.

BACKGROUND OF THE INVENTION

Despite the proliferation of electronic data, the ability to streamline interactions with customers remains an elusive goal. For example, when customers call a company to enroll or change their services with the company, very often the conversation must be paused to allow the representative time to find the program and/or webpage that relates to the customer's desired action.

Accordingly, there is an unmet need to provide companies, such as insurance companies, the ability to streamline interactions with their customers by automating content delivery before it is requested, and also by enabling more fluid content request interactions.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a computer implemented method and system is described for automating electronic content delivery of predictive information to a customer service representative of a company relevant to an ongoing communication between a customer service representative and a customer.

In accordance with an illustrated embodiment, a first customer data set is entered in the computer system for preferably identifying a customer. Displayed on a first desktop on a representative's computer system is information related to the customer, which may include customer purchased company products and services based on the first data set. A second data set is entered in the computer system preferably by the representative, or in an automated fashion, contingent upon interaction between the representative and the customer. For instance, determination of the second data set may include receiving audio information from a communication between the customer and a representative and automatically generating a textual representation of at least a portion of the audio information.

Predictive analytics are performed upon at least a portion of the first and second data sets to determine predictive information relevant to an ongoing communication between the customer service representative and the customer. The predictive information may describe at least a portion of a process for altering a product previously sold to the customer and/or at least a portion of a process for initiating sale of a product to the customer. Displayed on a second desktop on the representative's computer system is the determined predictive information for review by the representative during an interaction with the customer.

Additional aspects of the illustrated embodiments may include determining the first data set from a customer communication with the company and/or determining the first data set contingent upon the customer entering a Web site hosted by the company. Another aspect may include modifying a portion of at least one of the first and second desktops according to a level of expertise of the customer service representative.

BRIEF DESCRIPTION OF THE DRAWINGS

The accompanying appendices and/or drawings illustrate various non-limiting, examples and inventive aspects in accordance with the present disclosure.

FIG. 4 is an exemplary graphical user interface that may be used in one or more embodiments practicing the system in FIG. 1;

FIG. 5 is a second exemplary graphical user interface that may be used in one or more embodiments practicing the system in FIG. 1; and FIG. 6 is a third exemplary graphical user interface that may be used in one or more embodiments practicing the system in FIG. 1.

DETAILED DESCRIPTION OF CERTAIN EMBODIMENTS

Figure 1:
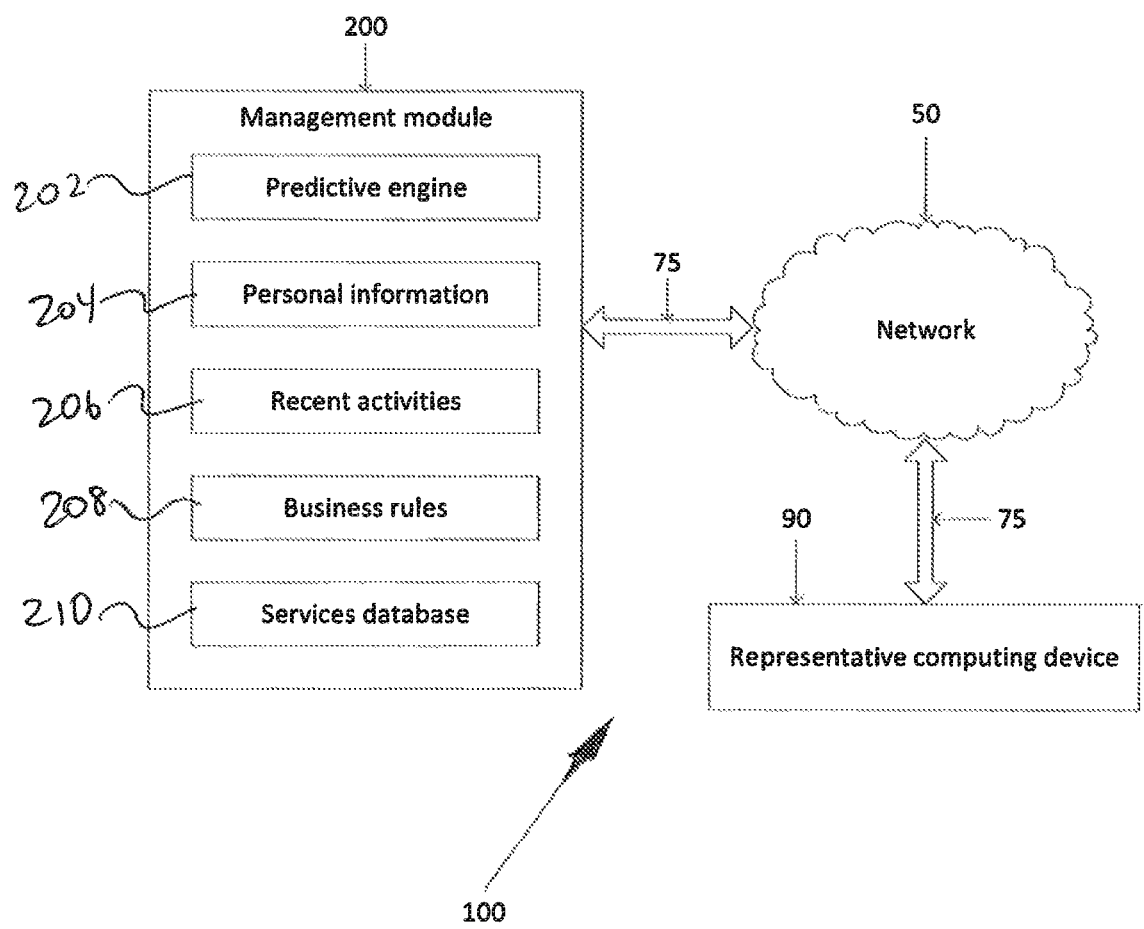
FIG. 1 illustrates an exemplary system for utilizing structural informatics to efficiently provide information by querying and analyzing available data sources.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments. Also, the flow charts and methods described herein do not imply either required steps or a required order to the steps, and the illustrated embodiments and processes may be implemented in any order and/or combination that is practicable.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. Commonly assigned U.S. Pat. Nos. 8,289,160 and 8,400,299 are related to certain embodiments described herein and are each incorporated herein by reference in their entirety.

As used herein, the term "insurance" refers to a contract between an insurer, known as an insurance company, and an insured, also known as a policy holder, in which compensation is paid by the insurer to the insured for some specific losses in exchange of a certain premium amount periodically paid by the insured in past. In a typical usage, whenever the insured suffers some loss for which he/she has insured or holds policy, the insured may file an insurance claim to request compensation for the loss.

Referring to FIG. 1, a hardware diagram depicting a system 100 provided by a company in which the processes described herein can be executed is provided for exemplary purposes. In one embodiment, company system 100 includes representative computing device 90 for allowing customer service representatives to access the company system 100. The computing device 90 is in communication with a network 50 by communication channels 75 in order to communicate with a management module 200. The management module 200 preferably includes a predictive engine 202, a personal information database 204 related to customers, a recent activities database 206, a business rules database 208 for storing business rules to be applied as described herein, and a services database 210 for storing information about various services a company may offer.

It is to be further understood that network 50 is a geographically distributed collections of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a dwelling, structure, residence or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

Communication channels 75 represents computerized communications as known by those skilled in the art. For instance, communication channels 75 may be wired links or may comprise a wireless communication medium, where certain nodes are in communication with other nodes, e.g., based on distance, signal strength, current operational status, location, etc. Moreover, each of the devices can communicate data packets (or frames) with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, and the like may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product in transitory and non-transitory manners. Accordingly, aspects of the present invention may take the form of an entirely hardware embodiment, an entirely software embodiment (including firmware, resident software, micro-code, etc.) or an embodiment combining software and hardware aspects that may generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. For exemplary purposes and without limitations, examples of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the server computer, partly on the server computer, as a stand-alone software package, partly on the server computer and partly on a remote computer (such as dwelling computing device 300) or entirely on the remote computer. In the latter scenario, the remote computer may be connected to the server computer through any type of network, including a local area network (LAN) or a wide area network (WAN), a combination thereof, or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart and/or block diagram block or blocks.

Figure 2:
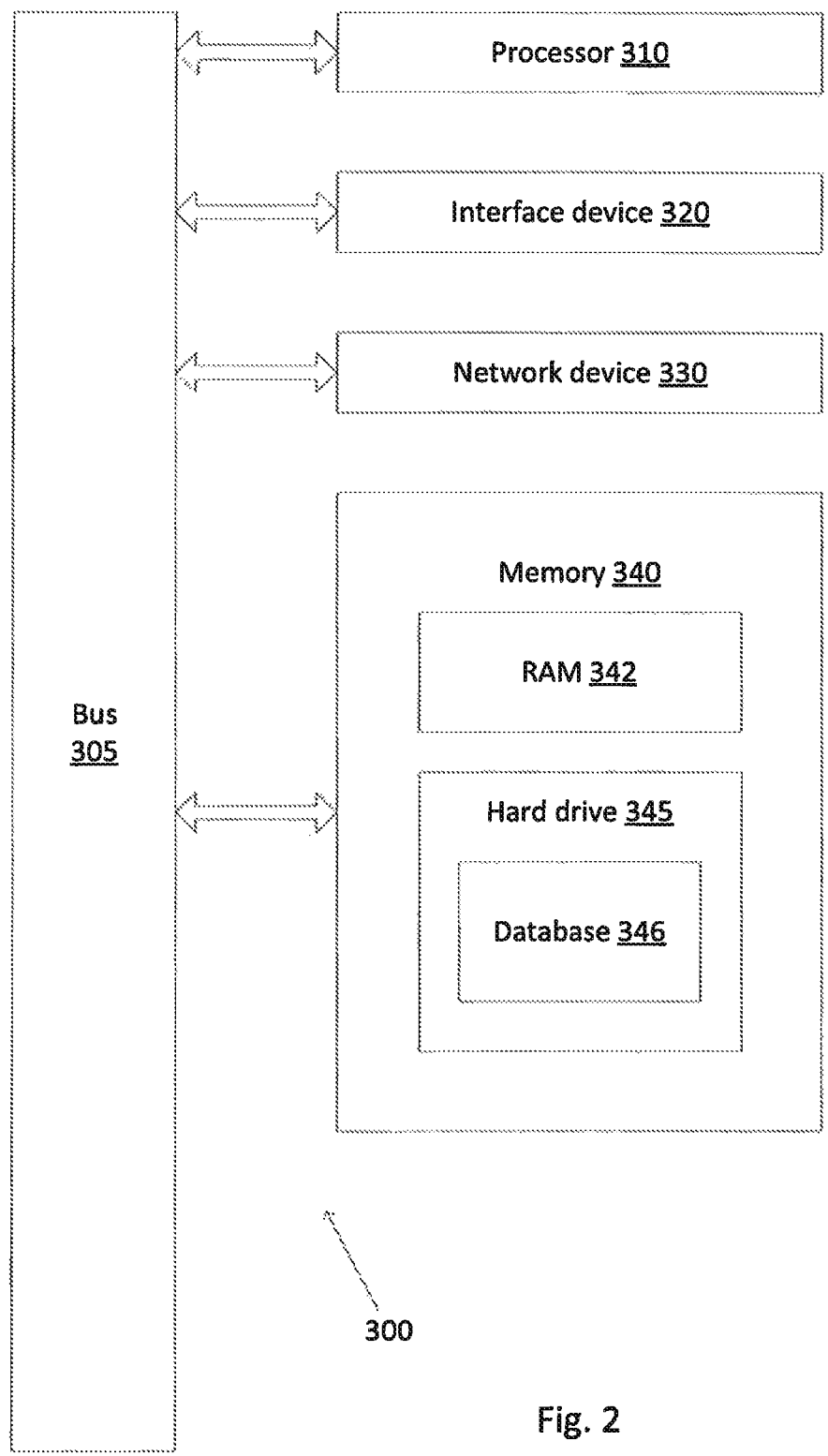
FIG. 2 illustrates a network computer device/node in accordance with an illustrated embodiment.

FIG. 2 is a schematic block diagram of an examplary computing device 300 that may be used (or components thereof) with one or more embodiments described herein. As explained above, in different embodiments these various devices be configured to communicate with each other in any suitable way, such as, for example, via communication channels 75 over network 50.

Device 300 is only one example of a suitable system and is not intended to suggest any limitation as to the scope of use or functionality of embodiments of the invention described herein. Regardless, computing device 300 is capable of being implemented and/or performing any of the functionality set forth herein.

Computing device 300 is operational with numerous other general purpose or special purpose computing system environments or configurations. Examples of well-known computing systems, environments, and/or configurations that may be suitable for use with computing device 300 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

Computing device 300 may be described in the general context of computer system-executable instructions, such as program modules, being executed by a computer system. Generally, program modules may include routines, programs, objects, components, logic, data structures, and so on that perform particular tasks or implement particular abstract data types. Computing device 300 may be practiced in distributed data processing environments where tasks are performed by remote processing devices that are linked through a communications network. In a distributed data processing environment, program modules may be located in both local and remote computer system storage media including memory storage devices.

Device 300 is shown in FIG. 2 in the form of a general-purpose computing device. The components of device 200 may include, but are not limited to, one or more processors or processing units 310 in communication with system memory 340 via bus 305. One or more interface devices 320 and a network device 330 communicate with the other components via the bus 305 as well.

Bus 305 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 300 typically includes a variety of computer system readable media. Such media may be any available media that is accessible by device 300, and it includes both volatile and non-volatile media, removable and non-removable media.

System memory 340 can include computer system readable media in the form of volatile memory, such as random access memory (RAM) 342, cache memory, and hard drive 345, which may include one or more databases 346. Computing device 300 may further include other removable/non-removable, volatile/non-volatile computer system storage media. By way of example only, hard drive 345 can be provided for reading from and writing to a non-removable, non-volatile magnetic media. Interface device 320 includes, without limitation, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 305 by one or more data media interfaces. As will be further depicted and described below, memory 340 may include at least one program product having a set (e.g., at least one) of program modules that are configured to carry out the functions of embodiments of the invention.

The management module 200 may utilitze a server or very similar hardware to the computing device 300. Management module 200, has at least one engine, such as predictive engine 202 that is described herein, which may be stored in memory that is separate or dedicated to the management module 200. The memory may function solely or in combination with an operating system, one or more application programs, other program modules, and program data. Each of the operating system, one or more application programs, other program modules, and program data or some combination thereof, may include an implementation of a networking environment. Management module 200 generally carries out the functions and/or methodologies of embodiments of the invention as described herein.

Device 300 may also communicate with one or more interface devices 320 such as a keyboard, a pointing device, a display, etc.; one or more devices that enable a user to interact with computing device 300; and/or any devices (e.g., network card, modem, etc.) that enable computing device 300 to communicate with one or more other computing devices. Such communication can occur via Input/Output (I/O) interfaces. Still yet, device 300 can communicate with one or more networks such as a local area network (LAN), a general wide area network (WAN), and/or a public network (e.g., the Internet) via a network adapter 320. As depicted, network adapter 320 communicates with the other components of computing device 300 via bus 305. It should be understood that although not shown, other hardware and/or software components could be used in conjunction with device 300. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Management module 200 may include, or otherwise may cooperate with, predictive engine 202. Predictive engine 202 enables data to be analyzed to identify an additional element that may be displayed on a representative's computing device. In one embodiment, predictive engine 202 analyzes customer information being displayed on an integrated desktop on a representative's computer. In another embodiment, predictive engine 202 analyzes data stored in one or more data sources, such as databases, and the data may or may not be similar and/or identical to the customer information being displayed on the representative's computer.

In another embodiment, predictive engine 202 analyzes a phone call between a customer and the representative to identify elements that may forecast future actions and/or processes to be initiated by the representative. For example, predictive engine 202 may receive data that represents audio information and generate textual representations for the same; these textual representations may be utilized to forecast future actions and/or processes to be initiated by the representative, such as those on behalf of the customer. It is contemplated herein that the data representing audio information may be in an analog format, digital format, and/or any format as would be recognized by those skilled in the art. It is also contemplated herein that, rather than utilizing the audio information to generate textual representations of the audio information, the audio information may be utilized to generate any type of representations of the same, including symbolic, pictographic, and/or any representation as would be recognized by those skilled in the art. It is further contemplated herein that the data representing audio information may instead be any information that represents communications, such as, for exemplary purposes only and without limitation, brail, video feeds (through which lip reading may be performed), and/or any communication methodology as would be recognized by those skilled in the art.

In another embodiment, the additional element displayed on representative's computer relates to at least part of the process for altering an insurance policy of the customer. For example, the predictive engine 202 may detect a circumstance that indicates the customer might want to alter their home insurance policy (e.g., the predictive engine 202 identifies that a dependent elder has moved into the same home), and so the additional element may generate questions for the representative to ask the customer (e.g., "does the new resident own valuable personal property that might justify increasing the home insurance coverage?"). In another example, the additional element may present and/or point to a link that (re)directs the representative's computer screen to display information related to altering and/or initiating insurance coverage for the customer.

In another embodiment, the predictive engine 202 may identify that a resource of the customer's (e.g., savings account, checking account, retirement account, trust) is above or below a certain threshold. For example, if the customer's checking account has funds above $20,000, the predictive engine 202 may generate an additional element on the representative's computer screen that provides instructions for how the representative can (1) offer to transfer money from the checking account to the savings account, and (2) instructions to legally transfer the money on the customer's behalf.

In another embodiment, the predictive engine 202 may identify that a mortgage percentage rate (e.g., Prime Rate, a customized and personal rate offered to that specific customer) that is below a certain percentage (e.g., 4.5%), and, based on that, the predictive element may generate and/or identify an additional element to be displayed on the representative's computer screen that provides instructions for how to offer and/or initiate a secured loan (e.g., mortgage, vehicle purchase with the vehicle as collateral) for the customer.

In another embodiment, the predictive engine 202 may identify a change in family status (e.g., new child, elder dependent moving in) and identify and/or generate an additional element to be displayed on the representative's computer screen, such as how to initiate and/or modify an educational savings fund, how to initiate and/or alter one or more of the customer's insurance policies, how to initiate and/or alter a secured loan (e.g., mortgage) that may be used to alter and/or renovate the customer's residence.

Figure 3A:
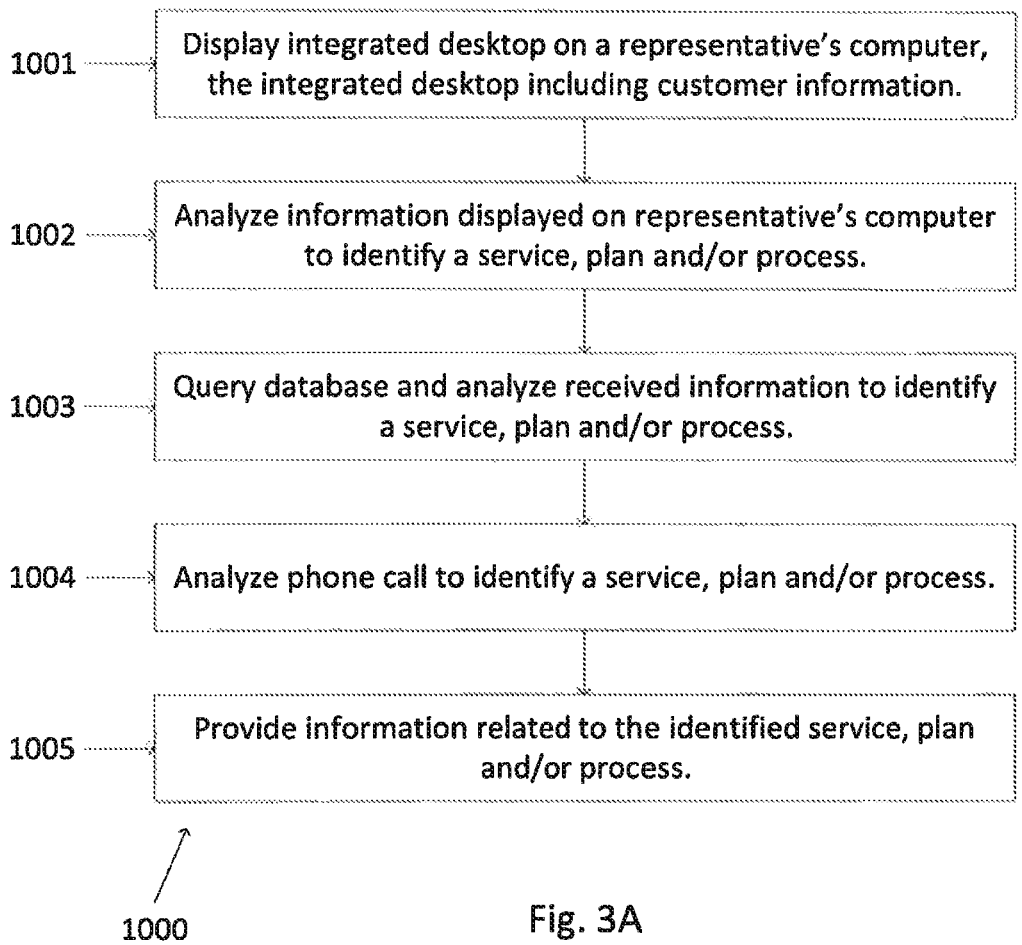
FIG. 3A is a flow diagram of exemplary operational steps of the structural informatics module of FIG. 1.
Figure 3B:
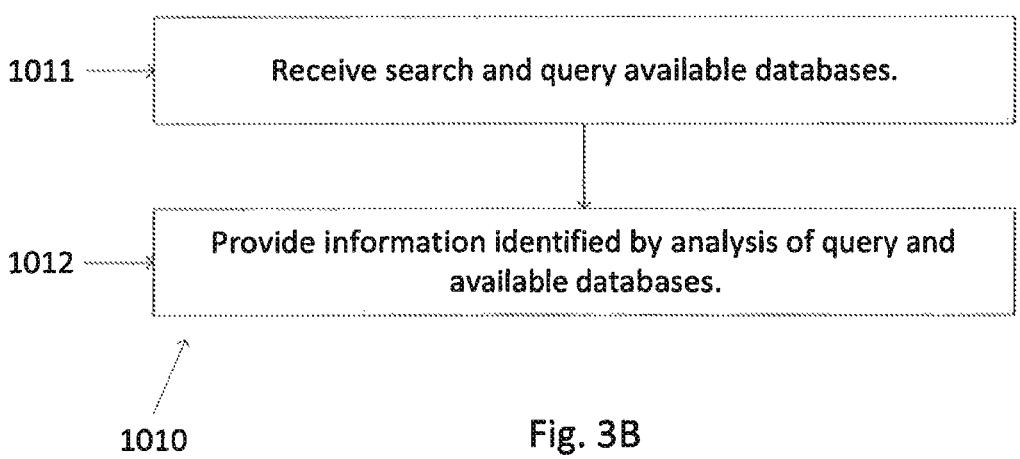
FIG. 3B is another flow diagram of exemplary operational steps of the structural informatics module of FIG. 1.

FIGS. 3A and 3B show, in the form of a flow chart (process 1000), exemplary operational steps of utilizing system 100. Before turning to descriptions of FIGS. 3A and 3B, it is noted that the flow diagram shown therein are described, by way of example, with reference to components shown in FIGS. 1 and 2, although these operational steps may be carried out in any system and are not limited to the scenario shown in the aforementioned figures. Additionally, the flow diagrams in FIGS. 3A and 3B shows an example in which operational steps are carried out in a particular order, as indicated by the lines connecting the blocks, but the various steps shown in these diagrams can be performed in any order, or in any combination or sub-combination that is practicable.

With reference to FIG. 3A, starting at step 1001, a desktop and/or interface, such as an integrated desktop, is displayed and/or communicated to a representative, such as via a computer 90. The desktop may include customer information that identifies and/or relates to a customer.

Subsequently, the predictive engine 202 analyzes information displayed on the representative's computer 90 (step 1002), data in one or more data sources such as data bases (step 1003), and/or analyzing a communications, such as a phone call, between the customer and the representative (step 1004). Based on one or more of these analysis, the predictive engine 202 will identify a service (e.g., insurance policy, mortgage and/or (secured) loan), plan (e.g., (educational) savings plan, retirement plan), and/or process (e.g., transferring money from one account/fund to another, enrollment in an security program to lower home insurance) that the representative may offer the customer. After identifying the service, the predictive engine 202 will identify and/or generate information and display it to the representative (step 1005), the information related to assisting the representative in initiating and/or altering a service, plan and/or process for the customer.

Turning now to FIG. 3B, illustrated therein is a process 1010 for utilizing one or more embodiments described herein to efficiently and effectively empower natural language searches, such as those by the representative. Starting at step 1011, the company system 100, such as via the predictive engine 202, receives a query from the representative and searching available data sources, such as databases. It is contemplated herein that the query may be input (e.g., via Scratch Pad 1022) via natural language rather than the more element-based typical search format (e.g., "how do I initiate a car insurance policy for this customer?" rather than "initiate car insurance") as discussed below with respect to FIG. 5. Subsequently, information relevant and/or responsive to the query is identified and presented to the representative (step 1012).

Turning now to FIG. 4, illustrated therein is an exemplary screen shot or interface 1020 (e.g., integrated desktop) that may be utilized by a representative that utilizes one or more embodiments described herein. The customer service representative accesses the interface 1020 by the computing device 90. The customer service representative may have entered an identification number, such as a policy or account number, or simply the name of the customer to access the interface 1020, which identifies the customer (e.g., Mister Tom Thompson). In another embodiment, the interface 1020 is presented to the customer service representative based on querying a customer database stored in memory using the incoming telephone number and/or name from the telecommunications network.

An upper bar 1023 includes a photograph and other relevant information of the customer such as name, title, tenure, date of birth, basis for eligibility and the like. The upper bar 1023 may also include characterization of the customer (e.g., "High Risk Authenticated"). The characterization may be based on past activity, survey results, statistical profiling using demographic information and the like.

Typically, the interface 1020 is presented upon the customer calling the company and reaching a customer service representative at a call center and providing contact information. However, the upper bar 1023 may also include a link area 1024 that allows calling, emailing, instant messaging, texting or otherwise contacting the customer by clicking in the area based upon the customer reviewing certain aspects of a company Web site hosted by the company system 100. The link area 1024 also includes status informations showing the customer's activity, such as browsing the company hosted Web site, and particular information that the customer has been reviewing such as a rental insurance calculator for personal belongings. Cookie technology can be used on the customer's computer to assist with the identification.

Similarly, the interface 1020 also includes a recent activity area 1025. The recent activity area 1025 can show the current status as well as a predetermined number of recent transactions or interactions with the company and/or the company Web site. Preferably, in addition to the current activity, the recent transactions are a portion of the data used to identify additional information pushed onto the interface 1020 in front of the customer service representative for discussion with the customer.

Still referring to FIG. 4, the interface 1020 also includes a personal data area 1026 containing such information as marital status and child related data along with contact information. Login information, communication preferences and the ability to manipulate and utilize the same is also presented in the personal data area 1026. A profile area 1027 includes member products with an optional "household view." The products may be grouped by affinity such as Banking, Insurance and Financial Information or chronologically and the like. The profile area 1027 can also include additional information such as a "Life Plan" area relating to goals, financial planning, and other events of the customer.

A scratch pad area 1022 may be utilized by the representative to take notes on the conversations (e.g., if the customer notes that money is tight then the representative may type that info into the scratch pad 1022, if the customer tells the representative of an address the representative may enter it in the scratch pad 1022). In one or more embodiments, the additional element to be displayed on the representative's computer is displayed in a lower bar 1021 and/or upper bar 1023, although it is contemplated herein that the additional element may be displayed via any means as would be known by those skilled in the art, such as, for exemplary purposes only and without limitation, a pop-up window.

During review of the interface 1020 by the customer service representative, notifications are provided in the lower bar 1021 and/or upper bar 1023. Such notifications may allow the customer service representative to click to expand or switch over to receive more information about the notification. The company system 100 may also jump over to the other information after a set amount of time, based upon keyword entry in the scratchpad area 1022 and the like. All or a portion of the information on the interface 1020 may remain available on the next screen. In the example of FIG. 4, as the customer is researching rental insurance, upon contact with the customer, the company system 100 presents the interface 1030 of FIG. 5 to the customer service representative.

Figure 6:
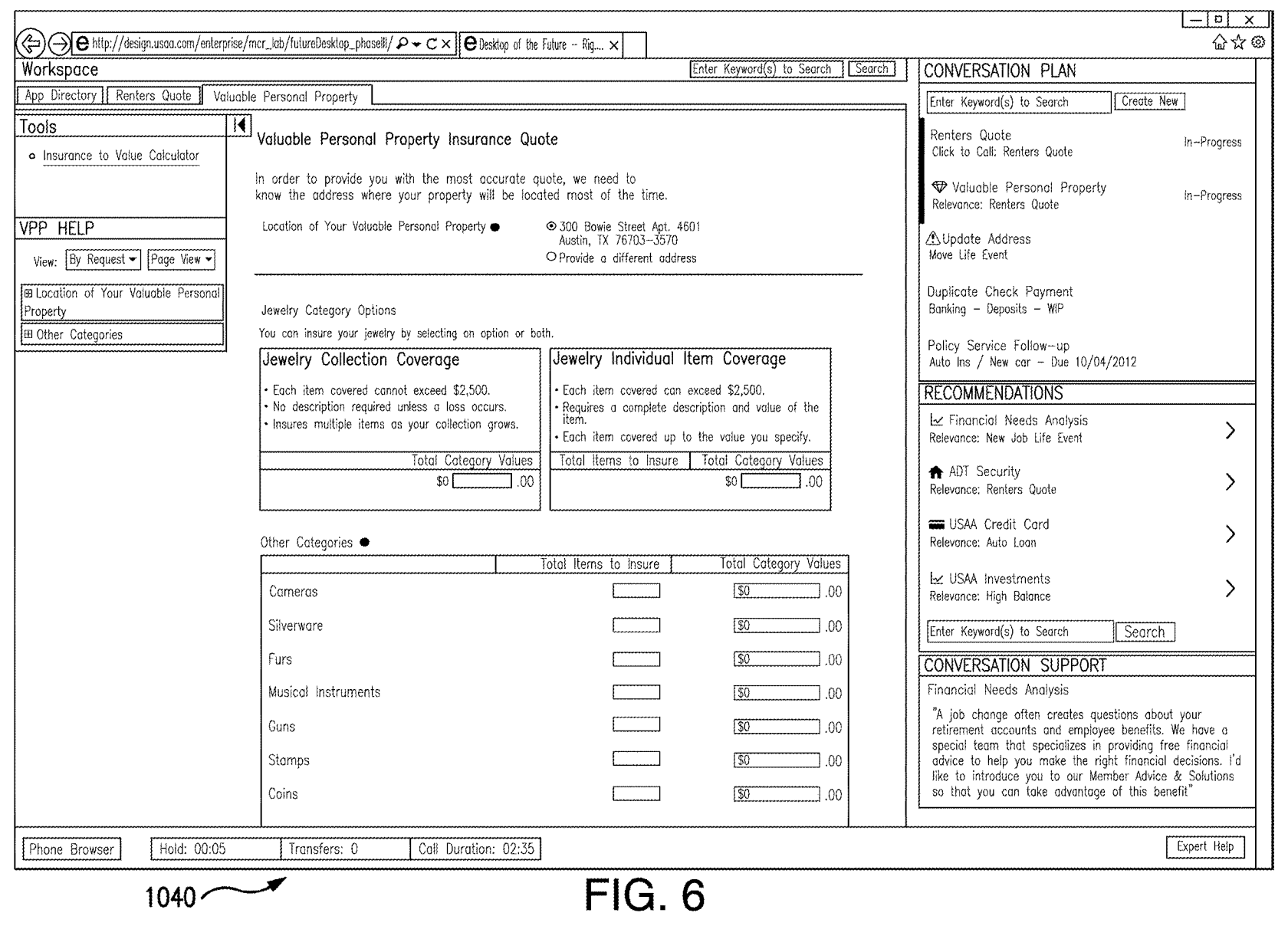

Referring to FIG. 5, another exemplary screen shot or interface 1030 in accordance with the subject technology is illustrated. The interface 1030 provides or gives access to all the information that the customer service representative needs in order to assist the customer with acquiring rental insurance. The interface 1030 also includes a search area 1032 in which natural language searching may be used by the customer service representative to find additional information. Traditional key word searching may also be available. Upon searching for additional information, upon completing the necessary information on interface 1030, or upon a similar trigger, the company system 100 may present additional screens to further assist the customer service representative. For example, the company system 100 may present the interface 1040 shown in FIG. 6. The interface 1040 allows entry of additional detailed information to generate a renter's insurance quote in accordance with the subject technology.

Preferably, the type of content provided to the customer service representative would be based on their level of expertise. Basic, intermediate and/or advanced screens can be presented depending on the experience of the customer service representative. Less experienced customer service representatives may receive more detailed information for a certain amount of time, until a certification level is met, or a test is passed and the like. The customer service representative or manager can update the settings to determine the level of information that is received by the customer service representative. The manager may review a plurality of recorded customer interactions as part of the process to certify up the customer service representatives.

Referring again to FIG. 5, in context, help is be provided to the customer service representative at the field level within the vertical application by selection of an expansion icon in "Renters Help" area 1032. For example, if renters insurance were already owned and the minimum limit of liability for a certain state had changed, this notification is provided to the customer service representative during interaction with the customer. The company system 100 would automatically provide the notification to the customer service representative via the interface 1030 and that appropriate action was needed. Similarly, as shown in FIG. 5, if the customer were inquiring about a loan, information related to loans with relevant notifications could be presented to the customer service representative in area 1034.

The company system 100 is also responsive to action taken by the customer service representative. The company system 100 provides the customer service representative with related actions for the open application. For example, if the customer service representative adds a child based on interaction with the customer, there will be additional actions that need to be or may be taken as a result of this change such as creation of a financial plan for payment of the child's college education.

The term "module" or "engine" is used herein to denote a functional operation that may be embodied either as a stand-alone component or as an integrated configuration of a plurality of subordinate components. Thus, "modules"/"engines" may be implemented as a single module or as a plurality of modules that operate in cooperation with one another. Moreover, although "modules" or "engines" may be described herein as being implemented as software, they could be implemented in any of hardware (e.g. electronic circuitry), firmware, software, or a combination thereof.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer-implemented method for automating electronic content presentation to a customer service representative in a Graphical User Interface (GUI) that streamlines interaction with a customer on a client computer, the method comprising:

providing a GUI on a customer service representative's client computer coupled to a server computer via a computer network, the GUI receiving customer identification relating to the customer from the computer network;

receiving, on the computer server, audio information from an ongoing communication between the customer and the customer service representative;

analyzing, in the computer server, the audible information conveyed in real-time between the customer service representative and the client;

determining, by the server computer, an ongoing conversation topic in real-time between the customer and the customer service representative based upon the analyzed audible information which includes generating a textual representation that represents at least a portion of the analyzed audio information by making reference to data stored in one or more databases coupled to the computer server;

performing, by the computer server, a statistical profile of the customer to determine a risk characterization of the customer;

identifying, in real-time by the server computer, additional information determined relevant to the ongoing conversation topic between the customer service representative and the customer wherein the additional information relates to a family status change; and displaying on the GUI of the customer service representative's client computer 1) the additional information and 2) a risk notification representative of the determined risk characterization of the user, wherein the risk notification is expandable to provide additional information associated with the determined risk characterization for the customer.

2. The computer-implemented method as recited in claim 1, further including determining by the server, questions to be asked by the customer service representative.

3. The computer-implemented method as recited in claim 2, wherein the questions to be asked by the customer service representative are based upon the determined ongoing conversation topic between the customer and the customer service representative.

4. The computer-implemented method as recited in claim 3, wherein the determined questions relate to changing an insurance policy of the customer based upon the life status change additional information relating to a new child.

5. The computer-implemented method as recited in claim 2, further including displaying a second interface on the GUI of customer service representative's client computer, wherein the second interface is presented separate from the first interface on the GUI, wherein the second interface includes the determined questions to be asked by the customer service representative during the ongoing communication with the customer.

6. The computer-implemented method as recited in claim 5, wherein the second interface further includes the generated textual representation that represents at least a portion of the analyzed audio information.

7. The computer-implemented method as recited in claim 6, wherein the second interface further includes the identified additional information determined relevant to the ongoing conversation topic between the customer service representative and the customer.

8. The computer-implemented method as recited in claim 7, wherein the additional information describes at least a portion of a process for altering a product already sold to the customer.

9. The computer-implemented method as recited in claim 8, wherein the second interface further includes an indicator indicating a risk characterization of the customer based upon the customer's past activity.

10. The computer-implemented method as recited in claim 2, further including providing in a first interface on the GUI a first scratchpad region configured such that the customer service representative enters information into the customer service representative's client computer during the audible conversation with the customer.

11. A computer system for automating electronic content presentation to a customer service representative in a Graphical User Interface (GUI) that streamlines interaction with a customer on a client computer, comprising:
a memory configured to store instructions;
a processor disposed in communication with said memory, wherein said processor upon execution of the instructions is configured to:
provide a GUI on a customer service representative's client computer coupled to a server computer via a computer network, the GUI receiving customer identification relating to the customer from the computer network;
receive audio information from an ongoing communication between the customer and the customer service representative;
analyze the audible information conveyed in real-time between the customer service representative and the client;
determine an ongoing conversation topic in real-time between the customer and the customer service representative based upon the analyzed audible information which includes generating a textual representation that represents at least a portion of the analyzed audio information by making reference to data stored in one or more databases coupled to the computer server;
perform a statistical profile of the customer to determine a risk characterization of the customer;
identify in real-time additional information determined relevant to the ongoing conversation topic between the customer service representative and the customer wherein the additional information relates to a family status change; and
display on the GUI of the customer service representative's client computer 1) the additional information and 2) a risk notification representative of the determined risk characterization of the user, wherein the risk notification is expandable to provide additional information associated with the determined risk characterization for the customer.

12. The computer system as recited in claim 11, wherein the processor is further configured to determine questions to be asked by the customer service representative.

13. The computer system as recited in claim 12, wherein the questions to be asked by the customer service representative are based upon the determined ongoing conversation topic between the customer and the customer service representative.

14. The computer system as recited in claim 13, wherein the determined questions relate to changing an insurance policy of the customer based upon the life status change additional information relating to a new child.

15. The computer system as recited in claim 12, wherein the processor is further configured to display a second interface on the GUI of customer service representative's client computer, wherein the second interface is presented separate from the first interface on the GUI, wherein the second interface includes the determined questions to be asked by the customer service representative during the ongoing communication with the customer.

16. The computer system as recited in claim 15, wherein the second interface further includes the generated textual representation that represents at least a portion of the analyzed audio information.

17. The computer system as recited in claim 16, wherein the second interface further includes the identified additional information determined relevant to the ongoing conversation topic between the customer service representative and the customer.

18. The computer system as recited in claim 17, wherein the additional information describes at least a portion of a process for altering a product already sold to the customer.

19. The computer system as recited in claim 18, wherein the second interface further includes an indicator indicating a risk characterization of the customer based upon the customer's past activity.

20. The computer system as recited in claim 12, wherein the processor is further configured to provide in a first interface on the GUI a first scratchpad region configured such that the customer service representative enters information into the customer service representative's client computer during the audible conversation with the customer.

* * * * *